United States Patent
Lin et al.

(10) Patent No.: US 11,624,803 B2
(45) Date of Patent: Apr. 11, 2023

(54) SYSTEM FOR DETECTING DIRECTION OF A VEHICLE HONK AND DETERMINING LOCATION OF HONKING VEHICLE

(71) Applicant: GM GLOBAL TECHNOLOGY OPERATIONS LLC, Detroit, MI (US)

(72) Inventors: Hejie Lin, Troy, MI (US); Xu Han, Novi, MI (US); Jing Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 17/076,170

(22) Filed: Oct. 21, 2020

(65) Prior Publication Data
US 2022/0120895 A1 Apr. 21, 2022

(51) Int. Cl.
*G01S 5/18* (2006.01)
*G01S 5/22* (2006.01)
(Continued)

(52) U.S. Cl.
CPC .......... *G01S 5/22* (2013.01); *B60R 11/0247* (2013.01); *G01S 3/8083* (2013.01)

(58) Field of Classification Search
CPC ........ G01S 15/931; G01S 7/526; G01S 15/08; B60R 11/0247; H04R 3/005; H04R 5/04; H04R 2499/13
See application file for complete search history.

(56) References Cited

U.S. PATENT DOCUMENTS 7,162,043 B2 * 1/2007 Sugiyama ................ G01H 3/00
367/125

7,787,328 B2 * 8/2010 Chu ....................... H04R 3/005
367/125
(Continued)

FOREIGN PATENT DOCUMENTS

EP 2836852 B1 * 7/2020 ............ G01B 21/00
EP 2759843 B1 * 12/2020 ............ G01S 3/808
(Continued)

OTHER PUBLICATIONS

Pak and Shin "Sound Localization Based on Phase Difference Enhancement Using Deep Neural Networks", IEEE/ACM Transactions on Audio, Speech, and Language Processing, vol. 27, No. 8, Aug. 2019 (Year: 2019).*

*Primary Examiner* — Yuqing Xiao
*Assistant Examiner* — Christopher Richard Walker (57) ABSTRACT

A system includes first, second, and third microphones configured to receive sound waves from a source of the sound waves. The system includes a memory configured to store first, second, and third phase difference maps for the first and second microphones, the second and third microphones, and the third and first microphones. The system includes a processor configured to measure first, second, and third phase differences between the sound waves received from the source by the first and second microphones, the second and third microphones, and the third and first microphones; receive the first, second, and third phase difference maps from the memory; and identify a location of the source of the sound waves based on the first, second, and third phase differences and the first, second, and third phase difference maps for the first and second microphones, the second and third microphones, and the third and first microphones.

20 Claims, 8 Drawing Sheets

(51) Int. Cl.
   *B60R 11/02*         (2006.01)
   *G01S 3/808*         (2006.01)

(56) References Cited

U.S. PATENT DOCUMENTS

| | | | |
|---|---|---|---|
| 2010/0225461 A1 | 9/2010 | Tuli | |
| 2011/0110531 A1* | 5/2011 | Klefenz | H04R 3/005 381/92 |
| 2021/0109187 A1* | 4/2021 | Watt | H04R 3/005 |

FOREIGN PATENT DOCUMENTS

| | | | | |
|---|---|---|---|---|
| KR | 20030089243 A | * | 11/2003 | |
| WO | WO-2015143243 A1 | * | 9/2015 | G01S 13/64 |

* cited by examiner

SYSTEM FOR DETECTING DIRECTION OF A VEHICLE HONK AND DETERMINING LOCATION OF HONKING VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for detecting direction of a vehicle honk and determining location of the honking vehicle.

While driving a first vehicle, whether in a city or on a highway, or while backing up in a driveway or in a parking garage, a second vehicle in the vicinity of the first vehicle may honk to warn or alert a driver of the first vehicle. It can be helpful to ascertain a direction of the honk and to ascertain a location of the second vehicle. Knowing the direction of the honk and the location of the second vehicle, which is the source of the honk, can help the driver of the first vehicle in deciding whether to change a lane and which lane (right or left) to switch to, whether to pull over (e.g., if the second vehicle is an emergency vehicle such as police, ambulance, fire truck, or a tow truck), and so on. Early detection of a honk can reduce a likelihood of collisions and congestion.

SUMMARY

A system comprises first, second, and third microphones configured to receive sound waves from a source of the sound waves. The system comprises a memory configured to store first, second, and third phase difference maps for the first and second microphones, the second and third microphones, and the third and first microphones. The system comprises a processor configured to measure first, second, and third phase differences between the sound waves received from the source by the first and second microphones, the second and third microphones, and the third and first microphones; receive the first, second, and third phase difference maps for the first and second microphones, the second and third microphones, and the third and first microphones from the memory; and identify a location of the source of the sound waves based on the first, second, and third phase differences and the first, second, and third phase difference maps for the first and second microphones, the second and third microphones, and the third and first microphones.

In other features, the first, second, and third microphones are arranged in a first vehicle, and the source of the sound waves is a honk from a second vehicle in a vicinity of the first vehicle.

In another feature, the processor is configured to generate at least one of the first, second, and third phase differences maps based on a frequency of the sound waves output by the source.

In other features, the processor is configured to generate the first phase difference map for the first and second microphones based on a first frequency of the sound waves emitted by the source; generate the second phase difference map for the second and third microphones based on a second frequency less than the first frequency; and generate the third phase difference map for the third and first microphones based on a third frequency less than the second frequency.

In another feature, the third frequency is half of the first frequency.

In other features, the processor is configured to generate the first, second, and third phase difference maps by arranging the first, second, and third microphones in a grid comprising a plurality of cells; and calculating phase differences for the first and second microphones, the second and third microphones, and the third and first microphones based on waves of first, second, and third frequencies originating from each of the cells of the grid.

In another feature, the processor is configured to identify the location of the source within an area of the grid in response to the sound waves having the first frequency.

In other features, the processor is configured to generate the first, second, and third phase difference maps to locate the source within a grid shaped area around the first, second, and third microphones, where the grid shaped area includes a plurality of cells; subtract the first, second, and third phase differences respectively from the first, second, and third phase difference maps; square results of the subtractions; add the squared results of the subtractions; and identify the location of the source in one of the cells for which a sum of the squared results of the subtractions is minimum.

In another feature, the processor is configured to display the location of the second vehicle on a display in the first vehicle.

In still other features, a method comprises receiving sound waves at first, second, and third microphones from a source of the sound waves. The method comprises storing in a memory first, second, and third phase difference maps for the first and second microphones, the second and third microphones, and the third and first microphones. The method comprises measuring first, second, and third phase differences between the sound waves received from the source by the first and second microphones, the second and third microphones, and the third and first microphones. The method comprises retrieving the first, second, and third phase difference maps for the first and second microphones, the second and third microphones, and the third and first microphones from the memory. The method comprises identifying a location of the source of the sound waves based on the first, second, and third phase differences and the first, second, and third phase difference maps for the first and second microphones, the second and third microphones, and the third and first microphones.

In other features, the method further comprises arranging the first, second, and third microphones are arranged in a first vehicle. The source of the sound waves is a honk from a second vehicle in a vicinity of the first vehicle.

In another feature, the method further comprises generating at least one of the first, second, and third phase differences maps based on a frequency of the sound waves output by the source.

In other features, the method further comprises generating the first phase difference map for the first and second microphones based on a first frequency of the sound waves emitted by the source; generating the second phase difference map for the second and third microphones based on a second frequency less than the first frequency; and generating the third phase difference map for the third and first microphones based on a third frequency less than the second frequency.

In another feature, the method further comprises selecting the third frequency as half of the first frequency.

In other features, the method further comprises generating the first, second, and third phase difference maps by arranging the first, second, and third microphones in a grid comprising a plurality of cells; and calculating phase differences for the first and second microphones, the second and third microphones, and the third and first microphones based on waves of first, second, and third frequencies originating from each of the cells of the grid.

In another feature, the method further comprises identifying the location of the source within an area of the grid in response to the sound waves having the first frequency.

In other features, the method further comprises generating the first, second, and third phase difference maps to locate the source within a grid shaped area around the first, second, and third microphones, where the grid shaped area includes a plurality of cells; subtracting the first, second, and third phase differences respectively from the first, second, and third phase difference maps; squaring results of the subtractions; adding the squared results of the subtractions; and identifying the location of the source in one of the cells for which a sum of the squared results of the subtractions is minimum.

In another feature, the method further comprises displaying the location of the second vehicle on a display in the first vehicle.

In still other features, a system comprises first, second, and third microphones configured to receive sound waves having a first frequency from a source of the sound waves. The system comprises a memory configured to store first, second, and third phase difference maps for the first and second microphones, the second and third microphones, and the third and first microphones. The first, second, and third phase difference maps are generated by calculating phase differences for the first and second microphones, the second and third microphones, and the third and first microphones based on waves of the first frequency and of second and third frequencies originating from a plurality of cells of a grid shaped area around the first, second, and third microphones. The system comprises a processor configured to measure first, second, and third phase differences between the sound waves received from the source by the first and second microphones, the second and third microphones, and the third and first microphones; and identify a location of the source in one of the cells of the grid shaped area based on the first, second, and third phase differences and the first, second, and third phase difference maps for the first and second microphones, the second and third microphones, and the third and first microphones.

In other features, the processor is configured to subtract the first, second, and third phase differences respectively from the first, second, and third phase difference maps; square results of the subtractions; add the squared results of the subtractions; and identify the location of the source in the one of the cells for which a sum of the squared results of the subtractions is minimum.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Using currently available methods, a direction of a honk or a location of a source of the honk cannot be determined. The present disclosure provides a system that uses phase difference maps (explained below) to determine the direction of a honk from passenger vehicles or emergency vehicles. Specifically, the system detects and visualizes the direction of the honk and determines the location of the honking vehicle using three external microphones installed in a vehicle. The location of a source of the honk (i.e., honking vehicle) can be found at a minimum value of a sum of squares of subtracted phase difference maps based on phase differences measured by the three microphones. Visualization of the honk direction and the honk source location is achieved by plotting the sum of the squares of the subtracted phase difference maps.

Figure 1:
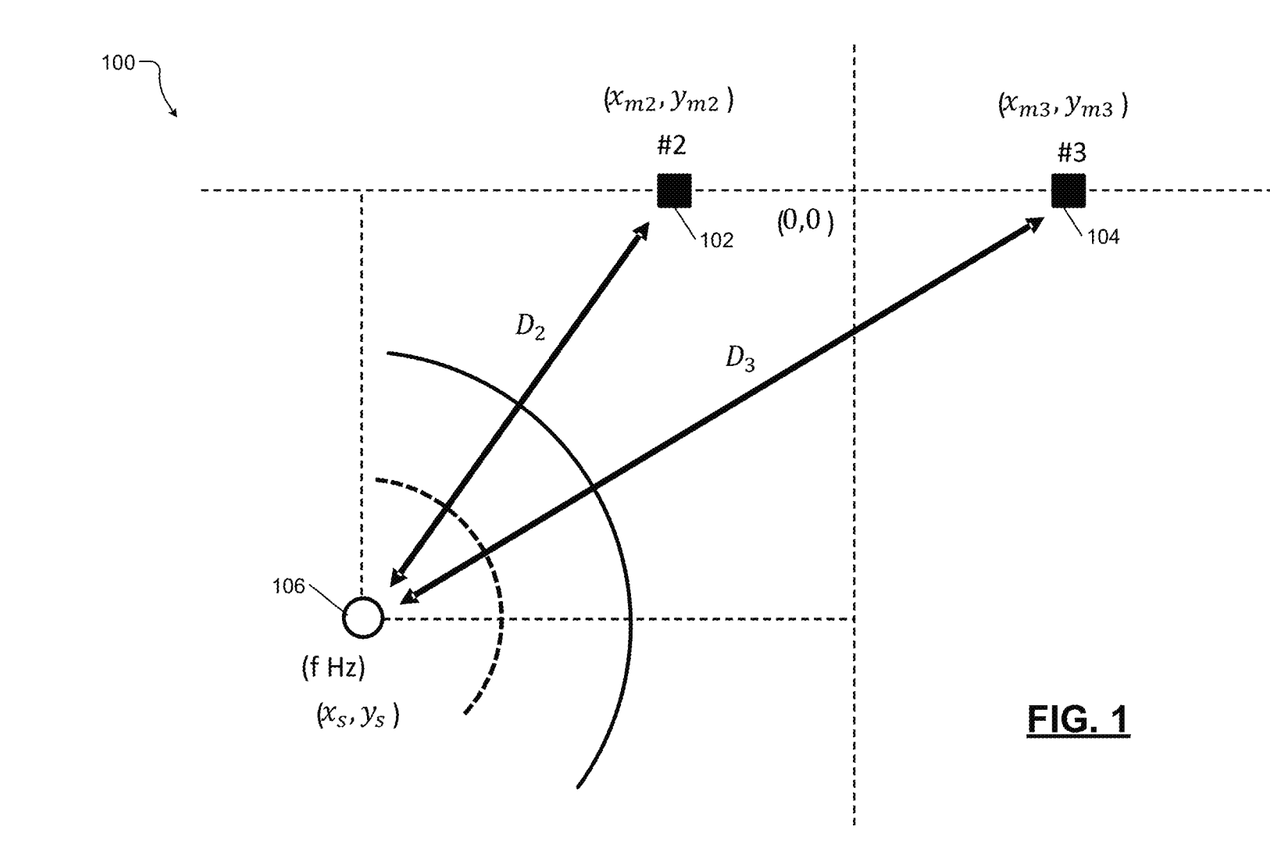
FIG. 1 shows an example of a system for determining a phase difference between two microphones.

FIG. 1 shows an example of a system 100 for determining a phase difference between two microphones 102 and 104. For example, the two microphones 102 and 104 may be installed on the exterior of a first vehicle. The locations of the two microphones 102, 104 may be given by Cartesian coordinates $(x_{m2}, y_{m2})$, $(x_{m3}, y_{m3})$, respectively. Further, a location of a source 106 of sound (e.g., a honk) having a frequency f may be given by Cartesian coordinates $(x_s, y_s)$. For example, the source 106 may be a second vehicle such as an emergency vehicle (e.g., police, fire, ambulance, etc.)

A phase difference $(\Delta\theta_{23})$ between sound waves received from the source 106 by the two microphones 102, 104 can be calculated as follows. First, distances D2 and D3 between the source 106 and the two microphones 102, 104 are calculated as follows.

$$D_2(x_s, y_s) = \sqrt{(x_s - x_{m2})^2 + (y_s - y_{m2})^2}$$

$$D_3(x_s, y_s) = \sqrt{(x_s - x_{m3})^2 + (y_s - y_{m3})^2}$$

A difference between the distances D2 and D3 is determined as follows.

$$\Delta D_{23}(x_s, y_s) = D_2 - D_3$$

A phase difference between the sound waves received from the source 106 by the two microphones 102, 104 can be calculated as follows.

$$\Delta \theta_{23}(x_s, y_s) = \frac{\Delta D_{23}}{\lambda} = \Delta D_{23}\left(\frac{f}{c}\right),$$

where $\lambda = 1/f$ is the wavelength of the sound (i.e., honk) emitted from the source 106;

and c is the speed of sound.

The signals received by the microphones 102, 104 are in a wrapped phase $(0 \sim 2\pi)$. The phase difference between two microphones 102, 104 is in a wrapped data format $(-2\pi \sim 2 \sim)$. Therefore, the method of determining the phase difference between the sound waves received from the source 106 by the two microphones 102, 104 is based on wrapped phase differences.

Figure 2A:
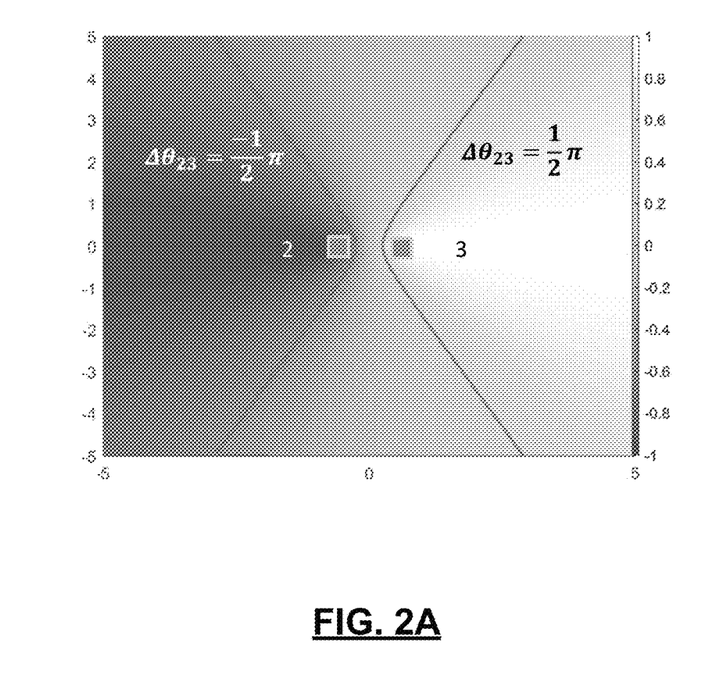
FIGS. 2A and 2B respectively show examples of contour lines of unwrapped and wrapped phase difference maps plotted based on phase differences between two microphones when location of sound source is unknown.
Figure 2B:
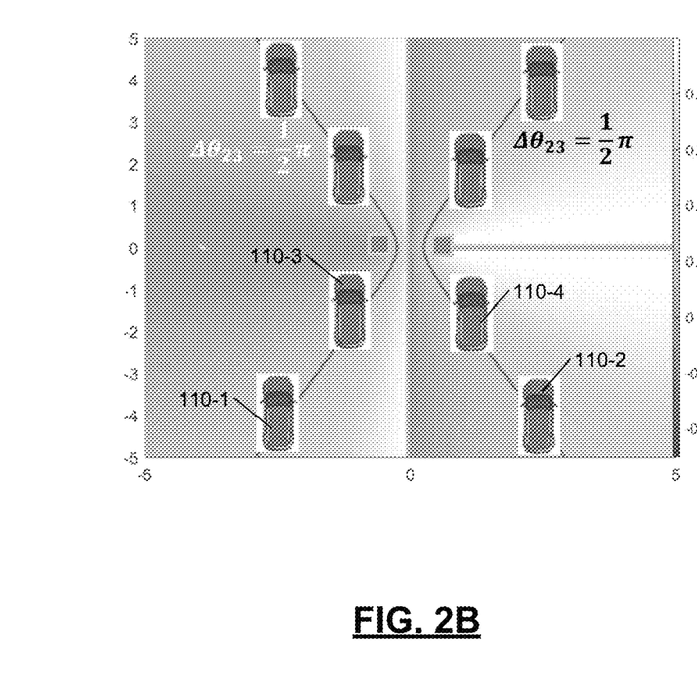

FIGS. 2A and 2B respectively show examples of contour lines of unwrapped and wrapped phase difference maps (PDMs) plotted based on phase differences between two microphones when the location of the sound source is unknown. In the phase difference maps shown, the relative distance of the sound source from the two microphones is plotted on the X-axis and the left Y-axis, and a normalized phase difference between the two microphones is plotted on the right Y-axis. Given a measured phase difference of the two microphones, the location of the sound source is on the contour lines of the phase difference maps. Examples of possible solutions for the location of the sound source are shown at 110-1, 110-2, 110-2, 110-4, and so on in FIG. 2B.

However, the exact location of the sound source cannot be determined with only two microphones. At least one more—a third—microphone (i.e., three or more microphones) can be used to determine the location of the sound source using phase difference maps generated based on phase differences between three microphone pairs as follows. Before describing the generation of the phase difference maps, a waterfall plot plotted for a plurality of honks is shown and described below with reference to FIG. 3. Frequencies selected from the waterfall plot may be used to generate the phase difference maps as explained below.

Figure 3:
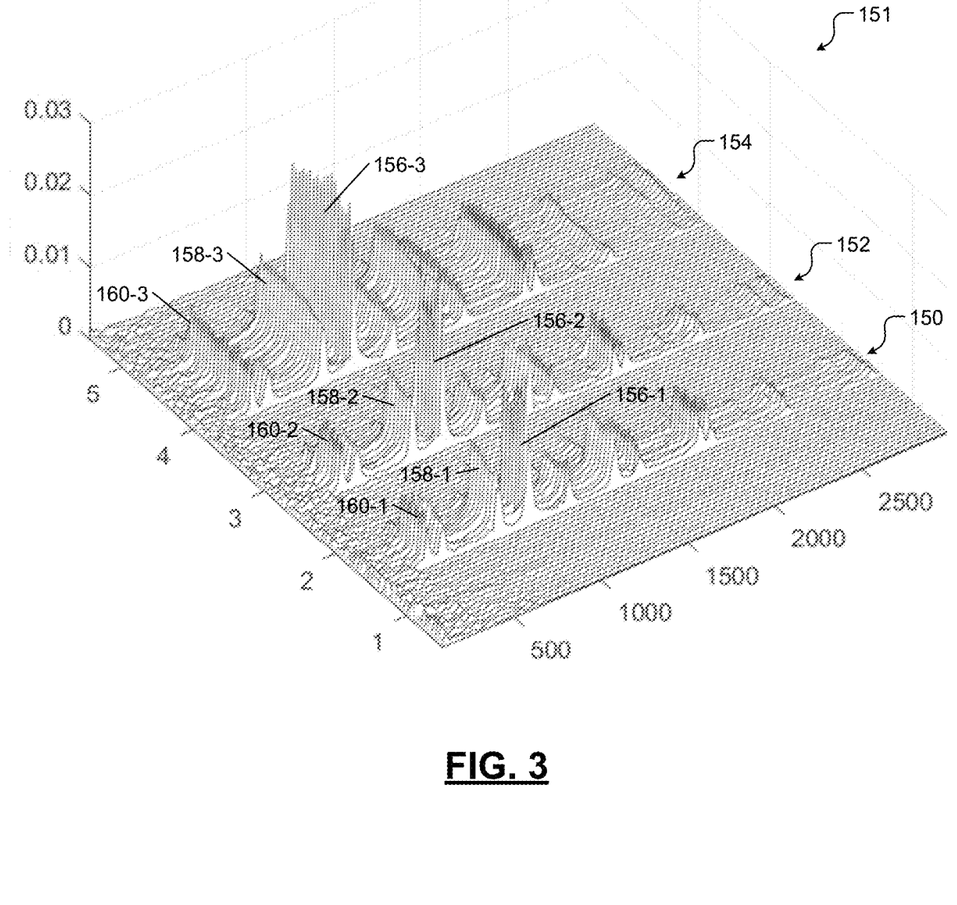
FIG. 3 shows an example of a waterfall plot when a honk is sounded three times in succession from a source at a fixed location.

FIG. 3 shows an example of a waterfall plot 151 when a honk is sounded three times in succession from a source at a fixed location. A waterfall plot is a three-dimensional plot in which multiple curves of data such as spectra are displayed simultaneously. In a waterfall plot, frequency, time, and magnitude are respectively plotted on X, Y, and Z axes. The curves in the waterfall plot are generally staggered both across and vertically.

In the example shown, a honk is sounded from a source at a fixed location three times in quick succession. The curves for the first, second, and third sequential honks are shown respectively at 150, 152, and 154. In each curve (i.e., for each honk), a peak with highest amplitude (magnitude) is identified, and a frequency for the peak is selected. In the example shown, the peak occurs for each of the three honks at about 1 kHz. These peaks, called first peaks, for the three honks are respectively shown at 156-1, 156-2, and 156-3.

Additionally, if available, one or two more peaks with successively lower or decreasing magnitudes than the first peak with the highest magnitude are identified. In the example shown, the second and third peaks for each of the three honks occur at about 800 Hz and 500 Hz, respectively. The second peaks for the three honks are shown at 158-1, 158-2, and 158-3 respectively. The third peaks for the three honks are shown at 160-1, 160-2, and 160-3, respectively. These frequencies of the first, second, and third peaks (about 1000, 800, and 500 Hz, respectively), which are about the same for the three honks, may be used to generate phase difference maps for three pairs of microphones as explained below.

Figure 4:
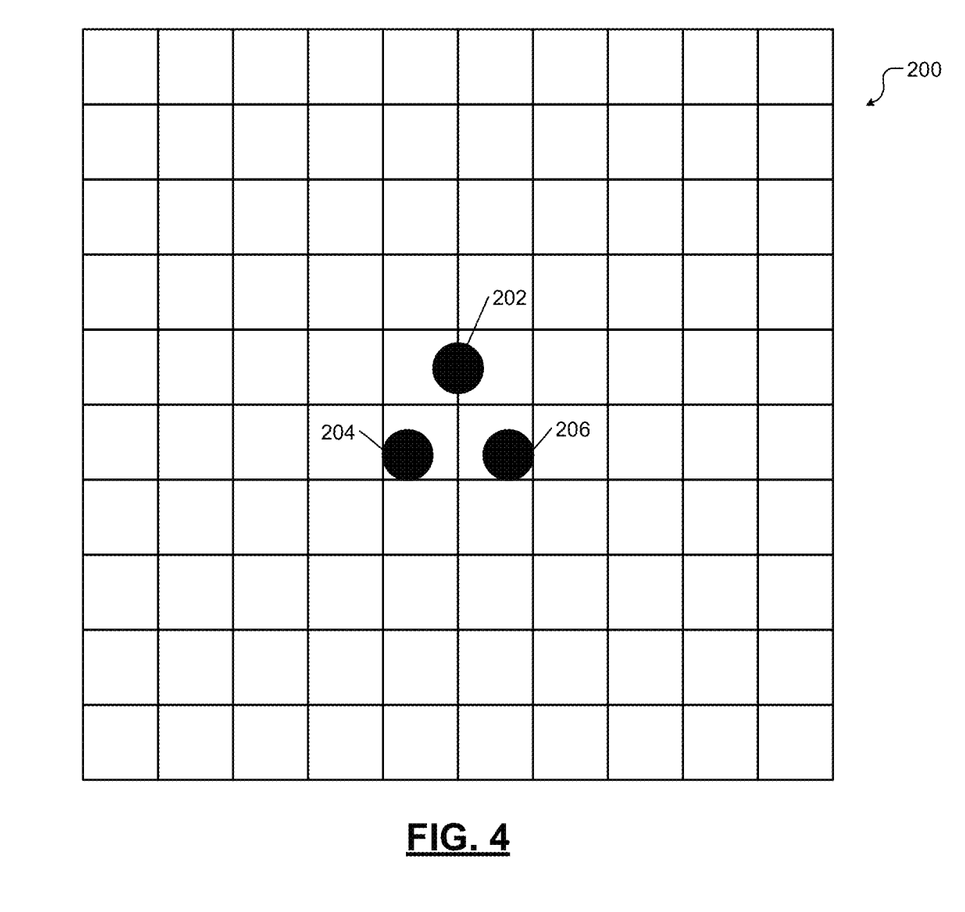
FIG. 4 shows an example of a grid and three microphones used for generating phase difference maps for three pairs of the microphones based on phase differences between the three pairs of microphones.

FIG. 4 shows an example of a grid 200 used for generating phase difference maps for three microphones 202, 204, and 206. These phase difference maps are generated when the vehicle is manufactured and are stored in the vehicle. These phase difference maps are then used in real time (i.e., while driving the vehicle) to locate a honking vehicle as explained below after describing the generation of the phase difference maps.

For example, the grid 200 used to generate the phase difference maps may be a 10×10 grid (i.e., with 100 cells) spanning an area of 50×50 m². Alternatively, any other area (M*N) and any other P×Q grid with P*Q cells may be used, where M, N, P, and Q are integers greater than 1, and where units of M and N can be feet, yards, or meters. The size and shape of the cells can be uniform or varied. The accuracy with which a honking vehicle can be located using the phase difference maps is proportional to the number of cells (i.e., cell density) in the grid 200. The accuracy with which a honking vehicle can be located using the phase difference maps is also proportional to the number of microphones.

The three microphones 202, 204, and 206 are arranged approximately near the center region of the grid 200 although the three microphones 202, 204, and 206 can be located anywhere in the grid 200. The three microphones 202, 204, and 206 may be separated from each other by a suitable distance. For example, the suitable distance may be determined based on a vehicle in which the three microphones 202, 204, and 206 will be installed.

The three microphones 202, 204, and 206 may be arranged at vertices of a triangle. The type of the triangle (e.g., equilateral, isosceles, right angled, or irregular triangle) may depend on the vehicle in which the three microphones 202, 204, and 206 will be installed. For the purpose of generating the phase difference maps, it is sufficient that the locations of the three microphones 202, 204, and 206, which are generally selected as described above, are fixed.

The three microphones 202, 204, and 206 can be grouped into three pairs: a first pair including the microphones 202, 204 (respectively also called midi and mic2 or first and second microphones); a second pair including the microphones 204, 206 (respectively also called mic2 and mic3 or second and third microphones); and a third pair including the microphones 206, 202 (respectively also called mic3 and midi or third and first microphones).

Figure 5:
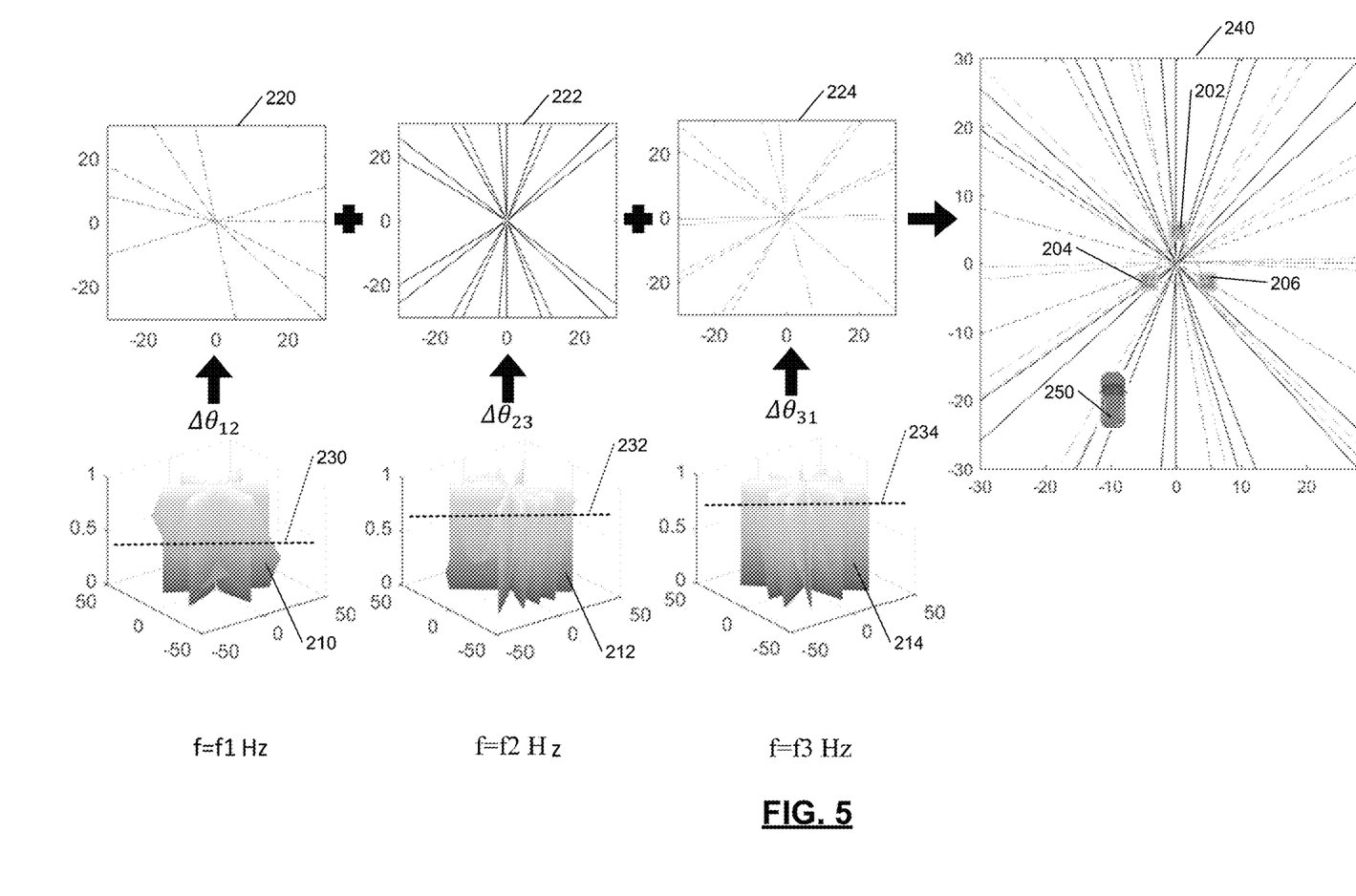
FIG. 5 shows the phase difference maps for the three pairs of microphones shown in FIG. 4 and subtracting phase differences measured while driving to determine location of a honking vehicle.

Suppose that a source of honk (e.g., element 106 shown in FIG. 1) is located at a first cell (any of the 100 cells shown). Suppose further than the honk from the source has the first peak at about 1 kHz, and the next two successively lower peaks respectively at 800 and 500 Hz as shown in FIG. 3. These three frequencies can be generally denotes as f1, f2, and f3, respectively, as shown in FIG. 5. For example, f1=1 kHz, f2=800 Hz, and f3=500 Hz. In general, f2 and f3 can have any values between f1 and f1/2, which may or may not be derived using a waterfall map as shown in FIG. 3.

With the source of honk (e.g., element 106 shown in FIG. 1) located at the first cell (any of the 100 cells shown), the distances from the source to each of the three microphones 202, 204, and 206 are known. Further, while f1 can be used in the equation shown and described with reference to FIG. 1 for calculating phase differences for each pair of microphones, the location of the source of honk can be determined more accurately if different frequencies f1, f2, and f3 as described above are used for different pairs of microphones.

For example, f1 may be used for calculating the phase difference between the first and second microphones 202, 204 (i.e., the first pair of microphones mic1 and mic2); f2 may be used for calculating the phase difference between the second and third microphones 204, 206 (i.e., the second pair of microphones mic2 and mic3); and f3 may be used for calculating the phase difference between the third and first microphones 206, 202 (i.e., the third pair of microphones mic3 and mic1).

With the distances from the source to each of the three microphones 202, 204, and 206 known, and with the frequencies f1, f2, f3 known, the phase differences $\Delta\theta_{12}$, $\Delta\theta_{23}$, and $\Delta\theta_{31}$ between the microphones in the three pairs of microphones are calculated using the equation shown and described with reference to FIG. 1.

Next, assuming the source of honk (e.g., element 106 shown in FIG. 1) is located at a second cell (any of the 100 cells shown), with the distances from the source to each of the three microphones 202, 204, and 206 known, and with the frequencies f1, f2, f3 known, the phase differences $\Delta\theta_{12}$, $\Delta\theta_{23}$, and $\Delta\theta_{31}$ between the microphones in each pair are calculated using the equation shown and described with reference to FIG. 1. Similarly, additional phase differences $\Delta\theta_{12}$, $\Delta\theta_{23}$, and $\Delta\theta_{31}$ are calculated by assuming that the source of honk is located at other cells of the grid 200, calculating the distances, and using the frequencies f1, f2, f3.

FIG. 5 shows phase difference maps for the three pairs of microphones shown in FIG. 4. Using the phase differences $\Delta\theta_{12}$ calculated as above for the first pair of microphones mic1 and mic2 (microphones 202, 204) for all the cells in the grid 200, a first phase difference map 210 is generated for the first pair of microphones mic1 and mic2 (microphones 202, 204). Using the phase differences $\Delta\theta_{23}$ calculated as above for the second pair of microphones mic2 and mic3 (microphones 204, 206) for all the cells in the grid 200, a second phase difference map 212 is generated for the second pair of microphones mic2 and mic3 (microphones 204, 206). Using the phase differences $\Delta\theta_{31}$ calculated as above for the third pair of microphones mic3 and mic1 (microphones 206, 202) for all the cells in the grid 200, a third phase difference map 214 is generated for the third pair of microphones mic3 and mic1 (microphones 206, 202). In the phase difference maps 210, 212, 214 shown, the distance is plotted on the X and Y axes, and a normalized phase difference is plotted on the Z axis.

Each phase difference map represents all possible solutions for the location of the source of the honk in the grid 200, based on the phase difference measured during use (e.g., while driving) by the respective pair of microphones. The phase difference map 210 represents all possible solutions for the location of the source of the honk in the grid 200, based on the phase difference measured during use by the first pair of microphones mic1 and mic2 (microphones 202, 204). The phase difference map 212 represents all possible solutions for the location of the source of the honk in the grid 200, based on the phase difference measured during use by the second pair of microphones mic2 and mic3 (microphones 204, 206). The phase difference map 212 represents all possible solutions for the location of the source of the honk in the grid 200, based on the phase difference measured during use by the third pair of microphones mic3 and mic1 (microphones 206, 202).

The exact location of the source of the honk in the grid 200 (and, while driving, in an area around the vehicle equal to the grid 200) can be determined using a combination of the three difference maps 210, 212, 214 as shown in FIG. 5 and as described below with reference to FIGS. 5 and 6.

Figure 6:
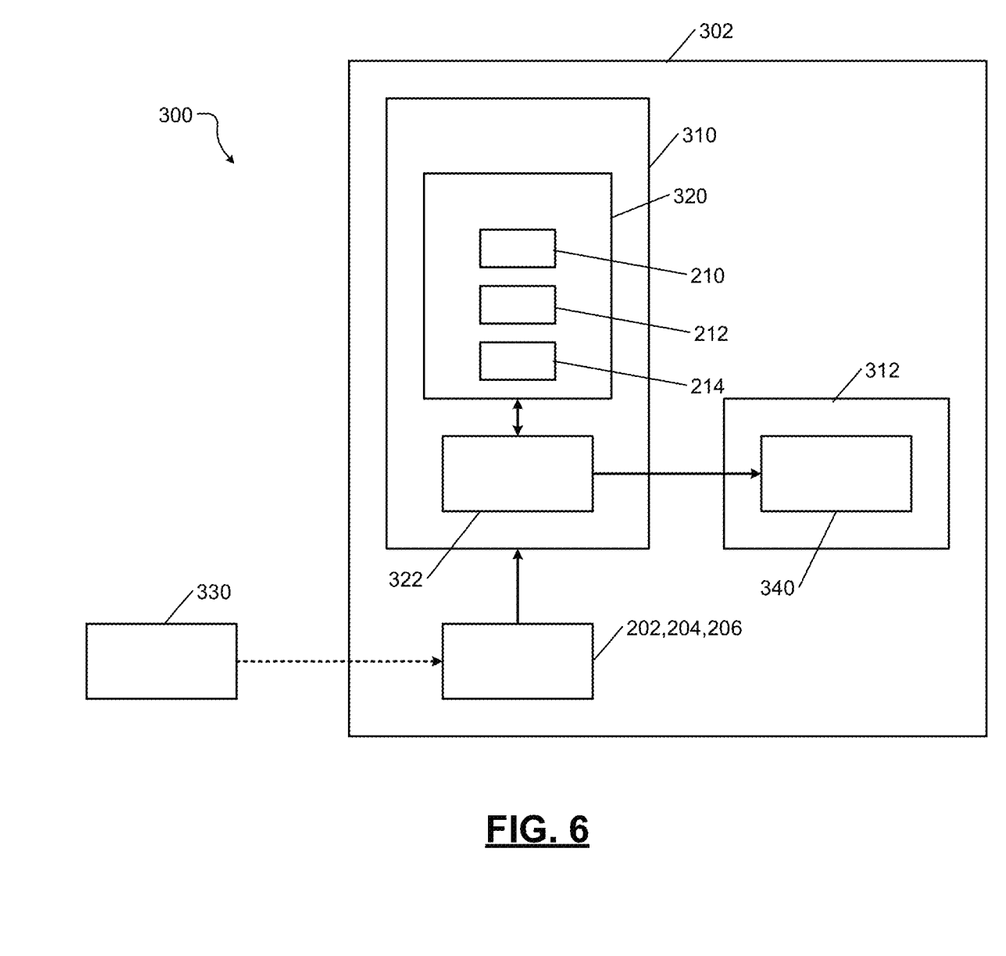
FIG. 6 shows a system for detecting a direction of a honk and locating a source of the honk using the three pairs of microphones and the phase difference maps shown in FIGS. 4 and 5.

FIG. 6 shows a system 300 for detecting a direction of a honk and locating a source of the honk using the three pairs of microphones and the phase difference maps shown in FIGS. 4 and 5 according to the present disclosure. The system 300 comprises the three microphones 202, 204, and 206 installed in a first vehicle 302. The system 300 further comprises a honk sensing module 310 and an infotainment module 312. The honk sensing module 310 comprises a memory 320 and a processor 322. The memory 320 stores the phase difference maps 210, 212, 214. The infotainment module 312 comprises, for example, multimedia, navigation, and other subsystems of the vehicle 302. The infotainment module 312 includes a display 340.

In use (e.g., while driving the vehicle 302), when a second vehicle 330 in the vicinity of the first vehicle 302 honks, the processor 322 calculates the phase differences $\Delta\theta_{12}$, $\Delta\theta_{23}$, and $\Delta\theta_{31}$ between microphones in the three pairs of microphones as described above. The processor 322 subtracts these phase differences $\Delta\theta_{12}$, $\Delta\theta_{23}$, and $\Delta\theta_{31}$ from the respective phase difference maps 212, 214, 216 stored in the memory 320. The results of the subtractions are shown in FIG. 5 at 220, 222, and 224, respectively. The subtractions can be viewed as horizontal sections taken off of the respective phase difference maps 210, 212, 214 at the values of the phase differences $\Delta\theta_{12}$, $\Delta\theta_{23}$, and $\Delta\theta_{31}$, as shown in FIG. 5 at 230, 232, and 234, respectively.

The processor 322 then adds the results 220, 222, and 224 of the subtractions to generate a net result 240 shown in FIG. 5. The processor 322 then calculates the location $(x_s, y_s)$ of the source (i.e., the second vehicle 330) in a cell in the grid 200 at the minimum value of the sum of the square of the subtracted phase difference maps 212, 214, 216 as:

$$\min \Sigma_{i=1}^{3}(FDM_{j,i}-FD_i)^2,$$

where $FDM_{j,i}$ is the phase difference map (in a matrix form) of microphone pair i; and $FD_i$ is the measured phase difference (scaled) of microphone pair i.

An example of the exact location of the second vehicle 330 that honked as detected by the first vehicle 302 is shown in FIG. 5 at 250. The processor 322 generates a visual indication, based on and similar to element 240 shown in FIG. 5, including an indication of the location of the second vehicle 330 as shown at 250 in FIG. 5, on the display 340 of the infotainment module 312. Based on the visual indication on the display 340, the driver of the first vehicle 302 can decide whether to change lane, pull over, etc.

Figure 7:
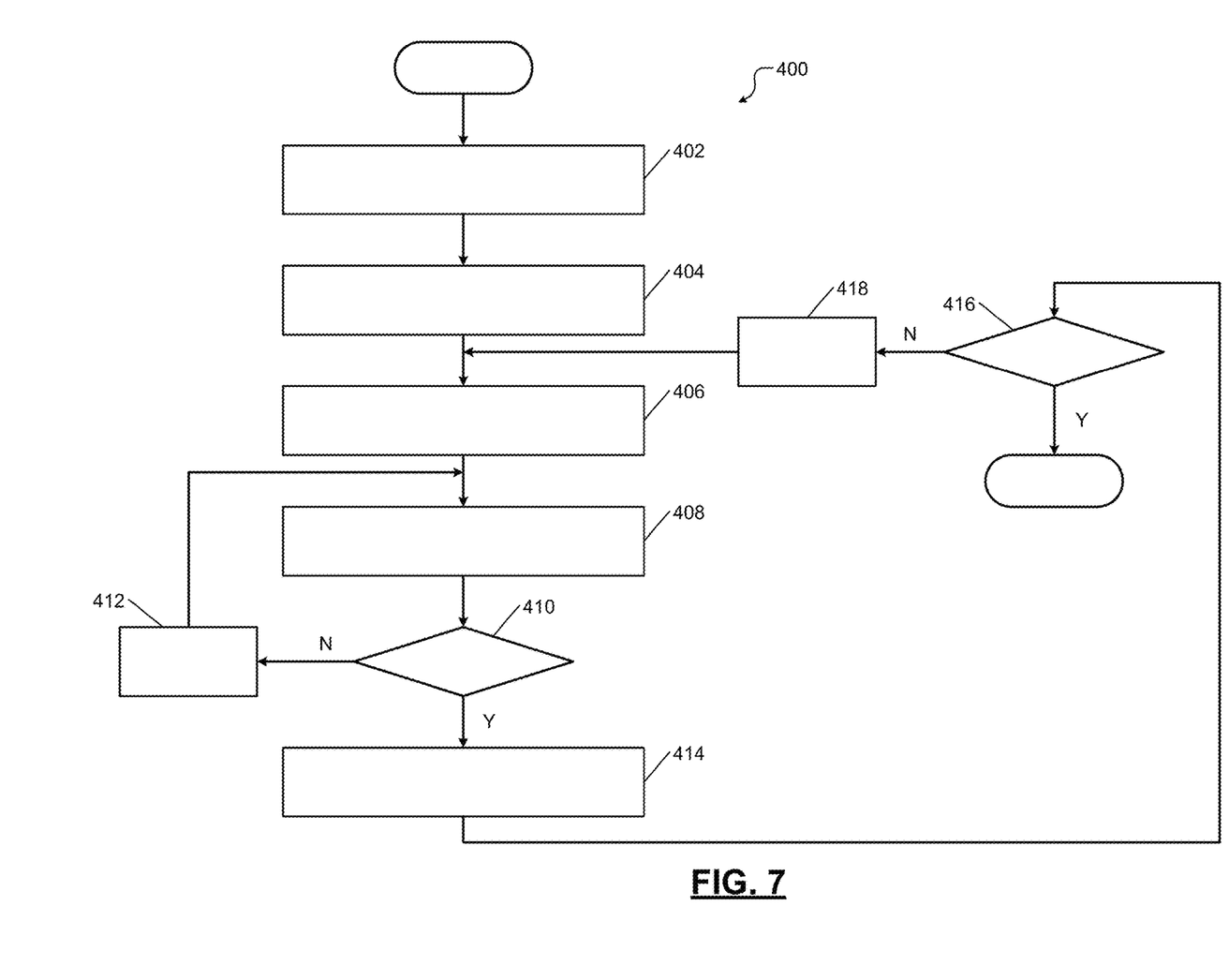
FIG. 7 shows a method for generating the phase difference maps shown in FIG. 5 using the three microphone pairs shown in FIG. 4.

FIG. 7 shows a method 400 for generating the phase difference maps shown in FIG. 5 using the three microphone pairs shown in FIG. 4 according to the present disclosure. For example, the method 400 can be performed by the honk sensing module 310 of the system 300 shown in FIG. 6. The term control in the following description refers to the processor 322 of the honk sensing module 310.

At 402, control defines pairs of three (or more) microphones (e.g., mics 1-2, mics 2-3, and mics 3-1). At 404 control defines locations of the three (or more) microphones in a grid of j cells (e.g., $x_{m1}, y_{m1}; x_{m2}, y_{m2}; x_{m3}, y_{m3}$).

At 406, control retrieves locations of mic pair i. At 408, control calculates a phase difference for mic pair i assuming a sound source is present in cell j. At 410, control determines if j is the last cell of the grid. If j is not the last cell of the grid (i.e., if the phase difference for the mic pair i is not determined for all cells j of the grid), at 412, control increments j, and control returns to 408. If j is the last cell of the grid (i.e., if the phase difference for the mic pair i is determined for all cells j of the grid), at 414, control generates a phase difference map ($FDK_{j,i}$) for the mic pair i.

At 416, control determines if phase difference maps are generated for all mic pairs. If phase difference maps are not generated for all mic pairs, at 418, control increments i, and control returns to 406. If phase difference maps are generated for all mic pairs, control ends.

Figure 8:
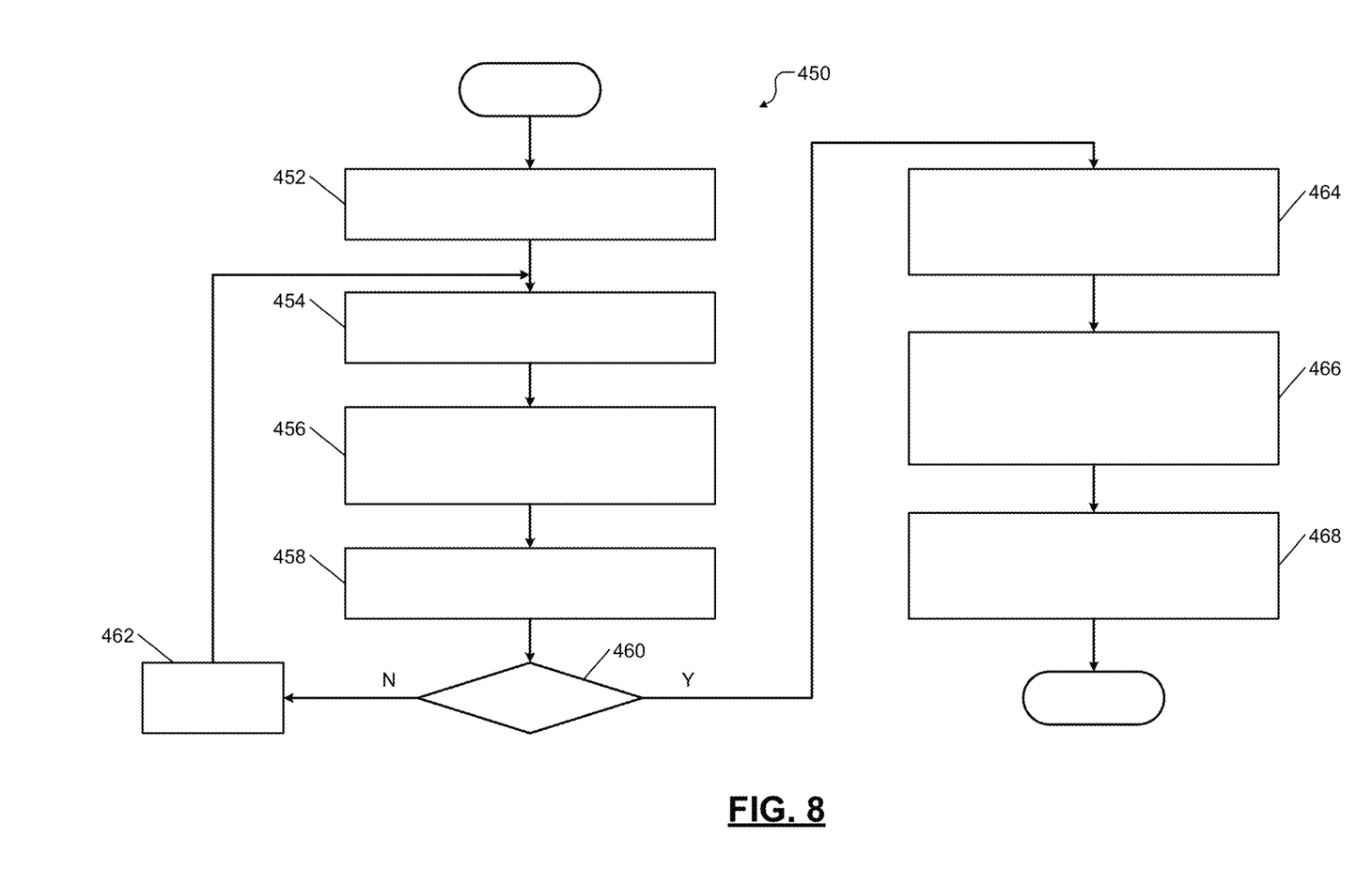
FIG. 8 shows a method for detecting a direction of a honk and locating a source of the honk using the three pairs of microphones and phase difference maps shown in FIGS. 4 and 5.

FIG. 8 shows a method 450 for detecting a direction of a honk and locating a source of the honk using the three pairs of microphones and phase difference maps shown in FIGS. 4 and 5 according to the present disclosure. For example, the method 450 can be performed by the honk sensing module 310 of the system 300 shown in FIG. 6. The term control in the following description refers to the processor 322 of the honk sensing module 310.

At 452, control measures phase difference ($FD_i$) for each mic pair i ($\Delta\theta_{12}$, $\Delta\theta_{23}$, and $\Delta\theta_{31}$). At 454, control retrieves from memory phase difference map ($FDM_{j,i}$) for mic pair i. At 456, control subtracts phase difference ($FD_i$) of mic pair i from the phase difference map ($FDM_{j,i}$) of the mic pair i as ($FDM_{j,i} - FD_i$). At 458, control calculates a square of the subtracted phase difference map for the mic pair i as ($FDM_{j,i} - FD_i$)$^2$.

At 460, control determines whether the processing is performed for all of the mic pairs. If the processing is not performed for all of the mic pairs, at 462, control increments i, and control returns to 452. If the processing is performed for all of the mic pairs, at 464, control adds the squares of the subtracted phase difference maps for all of the mic pairs as $\Sigma_i^3 (FDM_{j,i} - FD_i)^2$.

At 466, control finds a cell j in the grid for which the sum of the squares of the subtracted phase difference maps for all of the mic pairs is minimum (i.e., $\min \Sigma_{i=1}^3 (FDM_{j,i} - FD_i)^2$. The cell j of the grid for which the sum of the squares of the subtracted phase difference maps for all of the mic pairs is minimum is the location of the source of the honk.

At 468, control displays the direction and location of the source of the honk by potting a color map of the sum of the squares of the subtracted phase difference maps for all of the mic pairs. The driver of the vehicle can decide whether to change lane, pull over, etc. on viewing the displayed direction and location of the source of the honk.

While the present disclosure is described in the context of detecting the direction and location of a source of honk, the scope of the present disclosure is not so limited. The teachings of the present disclosure can also be applied to detecting the direction and location of any source of sound having a known frequency in various other applications.

For example, the teachings can be used for locating trapped people and animals in rescue missions. For example, a device can be equipped with three or more microphones and different sets of phase difference maps, each set designed to detect a sound of a different frequency. Such a device can be used to detect sources of sound having different frequencies.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules.

References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    first, second, and third microphones configured to receive sound waves from a source of the sound waves;
    a memory configured to store first, second, and third phase difference maps for the first and second microphones, the second and third microphones, and the third and first microphones; and
    a processor configured to execute instructions stored in the memory to:
        measure first, second, and third phase differences between the sound waves received from the source by the first and second microphones, the second and third microphones, and the third and first microphones;
        receive the first, second, and third phase difference maps for the first and second microphones, the second and third microphones, and the third and first microphones from the memory; and
        identify a location of the source of the sound waves based on the first, second, and third phase differences and the first, second, and third phase difference maps for the first and second microphones, the second and third microphones, and the third and first microphones.

2. The system of claim 1 wherein the first, second, and third microphones are arranged in a first vehicle, and wherein the source of the sound waves is a honk from a second vehicle in a vicinity of the first vehicle.

3. The system of claim 1 wherein the processor is configured to generate at least one of the first, second, and third phase differences maps based on a frequency of the sound waves output by the source.

4. The system of claim 1 wherein the processor is configured to:
    generate the first phase difference map for the first and second microphones based on a first frequency of the sound waves emitted by the source;
    generate the second phase difference map for the second and third microphones based on a second frequency less than the first frequency; and
    generate the third phase difference map for the third and first microphones based on a third frequency less than the second frequency.

5. The system of claim 4 wherein the third frequency is half of the first frequency.

6. The system of claim 1 wherein the processor is configured to generate the first, second, and third phase difference maps by:
    arranging the first, second, and third microphones in a grid comprising a plurality of cells; and
    calculating phase differences for the first and second microphones, the second and third microphones, and the third and first microphones based on waves of first, second, and third frequencies originating from each of the cells of the grid.

7. The system of claim 6 wherein the processor is configured to identify the location of the source within an area of the grid in response to the sound waves having the first frequency.

8. The system of claim 1 wherein the processor s configured to:
    generate the first, second, and third phase difference maps to locate the source within a grid shaped area around the first, second, and third microphones, wherein the grid shaped area includes a plurality of cells;

subtract the first, second, and third phase differences respectively from the first, second, and third phase difference maps;

square results of the subtractions;

add the squared results of the subtractions; and identify the location of the source in one of the cells for which a sum of the squared results of the subtractions is minimum.

9. The system of claim 2 wherein the processor is configured to execute the instructions to display the location of the second vehicle on a display in the first vehicle.

10. A method comprising:

receiving sound waves at first, second, and third microphones from a source of the sound waves;

storing in a memory first, second, and third phase difference maps for the first and second microphones, the second and third microphones, and the third and first microphones;

measuring first, second, and third phase differences between the sound waves received from the source by the first and second microphones, the second and third microphones, and the third and first microphones;

retrieving the first, second, and third phase difference maps for the first and second microphones, the second and third microphones, and the third and first microphones from the memory; and identifying a location of the source of the sound waves based on the first, second, and third phase differences and the first, second, and third phase difference maps for the first and second microphones, the second and third microphones, and the third and first microphones.

11. The method of claim 10 further comprising:

arranging the first, second, and third microphones in a first vehicle, wherein the source of the sound waves is a honk from a second vehicle in a vicinity of the first vehicle.

12. The method of claim 10 further comprising generating at least one of the first, second, and third phase differences maps based on a frequency of the sound waves output by the source.

13. The method of claim 10 further comprising:

generating the first phase difference map for the first and second microphones based on a first frequency of the sound waves emitted by the source;

generating the second phase difference map for the second and third microphones based on a second frequency less than the first frequency; and generating the third phase difference map for the third and first microphones based on a third frequency less than the second frequency.

14. The method of claim 13 further comprising selecting the third frequency as half of the first frequency.

15. The method of claim 10 further comprising generating the first, second, and third phase difference maps by:

arranging the first, second, and third microphones in a grid comprising a plurality of cells; and calculating phase differences for the first and second microphones, the second and third microphones, and the third and first microphones based on waves of first, second, and third frequencies originating from each of the cells of the grid.

16. The method of claim 15 further comprising identifying the location of the source within an area of the grid in response to the sound waves having the first frequency.

17. The method of claim 10 further comprising:

generating the first, second, and third phase difference maps to locate the source within a grid shaped area around the first, second, and third microphones, wherein the grid shaped area includes a plurality of cells;

subtracting the first, second, and third phase differences respectively from the first, second, and third phase difference maps;

squaring results of the subtractions;

adding the squared results of the subtractions; and identifying the location of the source in one of the cells for which a sum of the squared results of the subtractions is minimum.

18. The method of claim 11 further comprising displaying the location of the second vehicle on a display in the first vehicle.

19. A system comprising:

first, second, and third microphones configured to receive sound waves having a first frequency from a source of the sound waves;

a memory configured to store first, second, and third phase difference maps for the first and second microphones, the second and third microphones, and the third and first microphones; wherein the first, second, and third phase difference maps are generated by:

calculating phase differences for the first and second microphones, the second and third microphones, and the third and first microphones based on waves of the first frequency and of second and third frequencies originating from a plurality of cells of a grid shaped area round the first, second, and third microphones; and a processor configured to execute instructions stored in the memory to:

measure first, second, and third phase differences between the sound waves received from the source by the first and second microphones, the second and third microphones, and the third and first microphones; and identify a location of the source in one of the cells of the grid shaped area based on the first, second, and third phase differences and the first, second, and third phase difference maps for the first and second microphones, the second and third microphones, and the third and first microphones.

20. The system of claim 19 wherein the processor is configured to:

subtract the first, second, and third phase differences respectively from the first, second, and third phase difference maps;

square results of the subtractions;

add the squared results of the subtractions; and identify the location of the source in the one of the cells for which a sum of the squared results of the subtractions is minimum.

* * * * *